(12) United States Patent   (10) Patent No.: US 9,082,104 B2
Heinkel et al.   (45) Date of Patent: Jul. 14, 2015

(54) METHOD AND APPARATUS FOR MANAGING SYSTEM SPECIFICATIONS

(75) Inventors: Ulrich Karl Heinkel, Chemnitz (DE); Joachim Knaeblein, Erlangen (DE); Axel Schneider, Baiersdorf (DE)

(73) Assignee: Alcatel Lucent, Boulogne-Billancourt (FR)

( * ) Notice: Subject to any disclaimer, the term of this patent is extended or adjusted under 35 U.S.C. 154(b) by 2130 days.

(21) Appl. No.: 11/670,470

(22) Filed: Feb. 2, 2007

(65) Prior Publication Data

US 2008/0189313 A1   Aug. 7, 2008

(51) Int. Cl.
  *G06F 19/00*   (2011.01)
  *G06Q 10/10*   (2012.01)

(52) U.S. Cl.
  CPC ..................... *G06Q 10/10* (2013.01)

(58) Field of Classification Search
  USPC .................................................. 700/97, 105
  See application file for complete search history.

(56) References Cited

U.S. PATENT DOCUMENTS

| | | | | |
|---|---|---|---|---|
| 5,163,016 | A * | 11/1992 | Har'El et al. | 716/5 |
| 5,493,508 | A * | 2/1996 | Dangelo et al. | 716/5 |
| 6,185,516 | B1 * | 2/2001 | Hardin et al. | 703/2 |
| 6,275,976 | B1 * | 8/2001 | Scandura | 717/120 |
| 6,889,096 | B2 * | 5/2005 | Spriggs et al. | 700/17 |
| 6,964,037 | B1 | 11/2005 | Pavlovic et al. | |
| 2006/0069986 | A1 | 3/2006 | Sandoval | |
| 2006/0129261 | A1 * | 6/2006 | Morita et al. | 700/103 |

FOREIGN PATENT DOCUMENTS

| | | |
|---|---|---|
| JP | H06-309314 | 4/1994 |
| JP | H08-249169 | 9/1996 |
| JP | H09-081560 | 3/1997 |
| JP | 2004-326812 | 11/2004 |

OTHER PUBLICATIONS

Detailed Description Text (DETX) paragraphs 12, 46, 179, 180, 190, 193, 194, 655, 656, 664, and 668; Detailed Description Paragraph Table (DETL) paragraph 1; and Claims Text (CLTX) paragraph 38 of U.S. Patent No. 6,275,976.*
Detailed Description Text (DETX) paragraph 527 of U.S. Patent No. 6,275,976.*
T. Dinkel et al., "Specification and Verification Techniques Using ADeVA," GMM/ITG/GI Workshop Methoden und Beschreibungssprachen zur Modellierung und Verification von Schaltungen und Systemen, Dresden, Apr. 2005.

(Continued)

*Primary Examiner* — Ryan Jarrett
(74) *Attorney, Agent, or Firm* — Wall & Tong, LLP

(57) ABSTRACT

The invention includes a method and apparatus for managing a system specification. The method includes identifying a first system specification defined at a first refinement level where the first system specification includes specification data, generating a second system specification at a second refinement level where the second system specification inherits the specification data of the first system specification, modifying the inherited specification data of the second system specification, and storing the second system specification including the modified specification data.

18 Claims, 6 Drawing Sheets

(56) References Cited

OTHER PUBLICATIONS

A. Schneider et al., "Formal Specification and Verification of Abstract Telecommunication Protocol Definitions," GMM/ITG/GI Workshop Methoden und Beschreibungssprachen zur Modellierung und Verifikation von Schaltungen und Systemen, Dresden, Mar. 2006.

A. Schneider et al., "Formal Verification of Abstract System and Protocol Specifications," 30th Annual IEEE/NASA Software Engineering Workshop, Columbia MD, Apr. 2006.

A. Schneider et al., "Automatic Visualization of Abstract System Specifications," 6$^{th}$International Conference on Quality Software QSIC, Beijing, China, Oct. 2006.

A. Schneider, et al., "Formal Verification of System Specifications as Early System Test Activity," ASQF Fachgruppe Software-Test, Erlangen, Nov. 2006.

Office Action in corresponding Mexican Application MX/a/2009/007932, dated Jan. 17, 2011, pp. 1-2.

Office Action in corresponding Mexican Application MX/a/2009/007932, dated Sep. 22, 2011, pp. 1-4.

Office Action in corresponding Chinese Application 200880003525.3, dated May 25, 2011, pgs. 1-6.

Office Action in corresponding Korean Application 10-2009-7015944, dated Oct. 20, 2011, pp. 1-5.

Ep Search Report in corresponding European Application 08724669.0, dated Jan. 27, 2012, pp. 1-5.

Office Action in corresponding Taiwan Application 096151489, Jan. 6, 2014, pp. 1-6.

Office Action in corresponding Japanese Application 2009-548263, dated Jul. 25, 2012, pp. 1-8.

Office Action in corresponding Japanese Application 2009-548263, dated Oct. 3, 2013, pp. 1-3.

Decision of Rejection of corresponding Taiwan Application 096151489, dated Sep. 25, 2014, consisting of pp. 1-7.

PCT Search Report & Written Opinion in PCT/US08/00779 dated Oct. 9, 2008, 7 pages.

\* cited by examiner

100

300

400

US 9,082,104 B2

METHOD AND APPARATUS FOR MANAGING SYSTEM SPECIFICATIONS

FIELD OF THE INVENTION

The invention relates to the field of communication networks and, more specifically, to generating and managing system specifications.

BACKGROUND OF THE INVENTION

A technical specification is the basis for the implementation of a technical system. A technical specification may include one or more system requirements documents, as well as additional system specification documents (e.g., system design documents defined using the system requirements documents) which further define the technical system. Currently, technical specifications are typically created using word processing applications (such as Microsoft WORD, Adobe FRAMEMAKER, and other such applications), and, after being created, technical specifications may be managed using technical specification management systems (such as Telelogic DOORS and other such systems). Disadvantageously, however, existing word processing applications and requirement management systems merely support revisioning, in which older versions of a technical specification object (e.g., a requirements document or a requirement data set) can be retrieved if needed. Furthermore, although existing requirement management systems provide linking support which enables logical linking between requirements, all requirements must be created first and linked together later.

Using existing word processing applications and requirement management systems, the only chance to speed up the specification creation and modification process is using copy-paste-modify functions. As the technical system is implemented, the associated technical specification (either entire documents or parts of different documents) tends to be copied, pasted, and modified in order to further define the technical specification (e.g., further defining existing requirements and technical details, as well as generating new requirements and technical details in existing specification documents or newly created specification documents). As the technical specification is modified during the implementation process, technical specification documents must be generated and modified. While logic links between requirements may help system designers identify all requirements and design objects derived from the modified requirement, all updates must still be performed manually. This manual process consumes significant development resources and significantly increases the likelihood of introducing design mistakes and inconsistencies which may impact system design cost, system stability, and other important design considerations.

SUMMARY OF THE INVENTION

Various deficiencies in the prior art are addressed through the invention of a method and apparatus supporting the system refinement process which includes the process of working from an initial system specification toward an associated system implementation. The invention provides a method and apparatus for managing a system specification. A method according to one embodiment of the invention includes identifying a first system specification including associated specification data where the first system specification is defined at a first refinement level, generating a second system specification at a second refinement level where the second system specification inherits the specification data of the first system specification, modifying the inherited specification data of the second system specification, and storing the second system specification including the modified specification data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention supports the system refinement process from system specification to system implementation. The present invention provides improved generation and management of system specifications. The present invention assists system designers during the system refinement process, facilitating the system refinement process and reducing introduction of system errors during the system refinement process. The present invention enables verification of transitions between refinement levels of the system refinement process. In other words, using the present invention a system specification is not a single large document; rather, the system specification is a set of requirements and associated sub-requirements being managed by a tool supporting the present invention.

A system is implemented using a system specification. As a system is implemented, the system specification which forms the basis for the implementation of the system proceeds through a series of refinement levels in which the system specification is further defined. A system specification includes a plurality of requirements. A requirement is a technical statement describing a feature or function which must be supported by the implemented system. A requirement may include one or more sub-requirements which further define that requirement. A sub-requirement may include technical information which further defines the sub-requirement and, thus, the associated requirement. As the system specification proceeds through the series of refinement levels, requirements of the system specification, and associated sub-requirements (including technical information), may be further defined. This system specification refinement process may be better understood with respect to FIG. 1.

Figure 1:
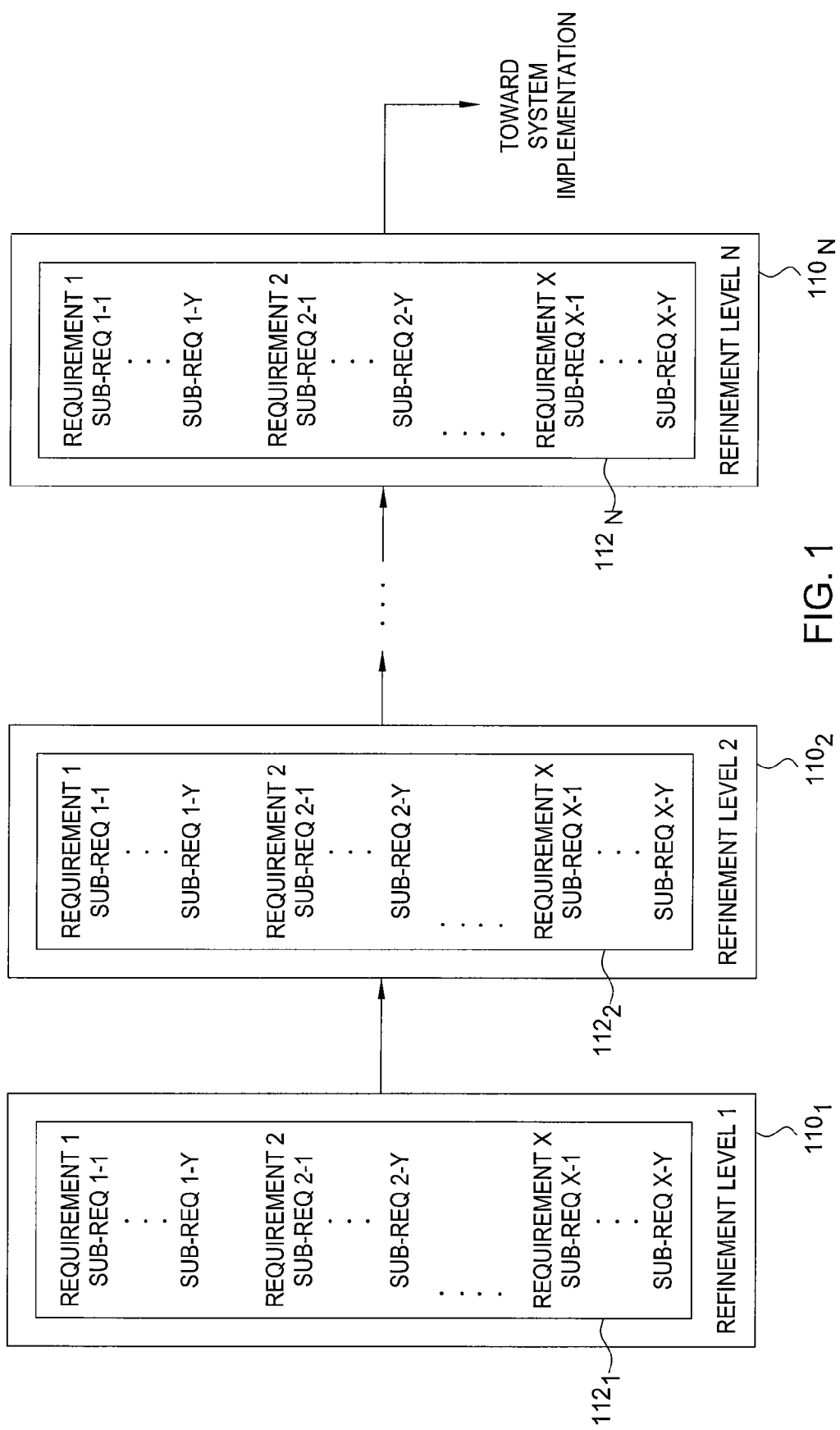
FIG. 1 depicts a high-level block diagram of a system specification refinement process.

FIG. 1 depicts a high-level block diagram of a system specification refinement process. Specifically, system specification refinement process 100 includes a plurality of refinement levels (RLs) $110_1$-$110_N$ (collectively, RLs 110) including a respective plurality of system specifications (SSs) $112_1$-

$112_N$ (collectively, SSs 112). The SSs $112_1$-$112_N$ are associated with one system. The SSs $112_1$-$112_N$ include successively detailed specifications for that one system. The SSs 112 each include a plurality of requirements (also referred to herein as elements). A requirement is a technical statement describing a feature or function which must be supported by the implemented system. A requirement may include one or more sub-requirements (also referred to herein as sub-elements). A sub-requirement may include any technical information which further defines that requirement.

As depicted in FIG. 1, each SS 112 includes a plurality of requirements (denoted as REQUIREMENT 1 through REQUIREMENT X) and, for each SS 112, each requirement includes a plurality of sub-requirements (denoted as sub-requirements SUB-REQ x-1 through SUB-REQ x-Y, where x denotes the requirement (one of the REQUIREMENT 1 through REQUIREMENT X) that is further defined by that sub-requirement). For example, for SS $112_1$ of RL $110_1$, the first requirement (denoted as REQUIREMENT 1) includes a plurality of sub-requirements (denoted as SUB-REQ 1-1 through SUB-REQ 1-Y), the second requirement (denoted as REQUIREMENT 2) includes a plurality of sub-requirements (denoted as SUB-REQ 2-1 through SUB-REQ 2-Y), and so on, for each requirement of SS $112_1$, for each SS 112.

The technical information included in a requirement and associated sub-requirements may include any information which further defines that requirement (e.g., text, parameters, functions, variables, values, data, models, and the like, as well as various combinations thereof). The technical information included in a requirement and associated sub-requirements may depend on the type of system specified for implementation (e.g., hardware systems versus software systems). For example, for a software system, a requirement may include sub-requirements such as specification text, software variables, software module dependencies, and the like, as well as various combinations thereof. For example, for a hardware system, a requirement may include sub-requirements such as specification text, timing data, formal state machine representations, and the like, as well as various combinations thereof.

As depicted in FIG. 1, a current refinement level (denoted refinement level n) inherits all specification data (i.e., requirements and associated sub-requirements) from a previous refinement level (denoted refinement level n-1). For example, RL $110_2$ inherits all specification data from RL $110_1$, RL $110_3$ (omitted for purposes of clarity) inherits all specification data from RL $110_2$, RL $110_N$ inherits all specification data from RL $110_{N-1}$ (omitted for purposes of clarity), and so on, toward the system implementation. As described herein, specification data of refinement level n-1 may be modified at refinement level n. The modification of specification data of refinement level n-1 at refinement level n may be better understood with respect to FIG. 2.

Figure 2:
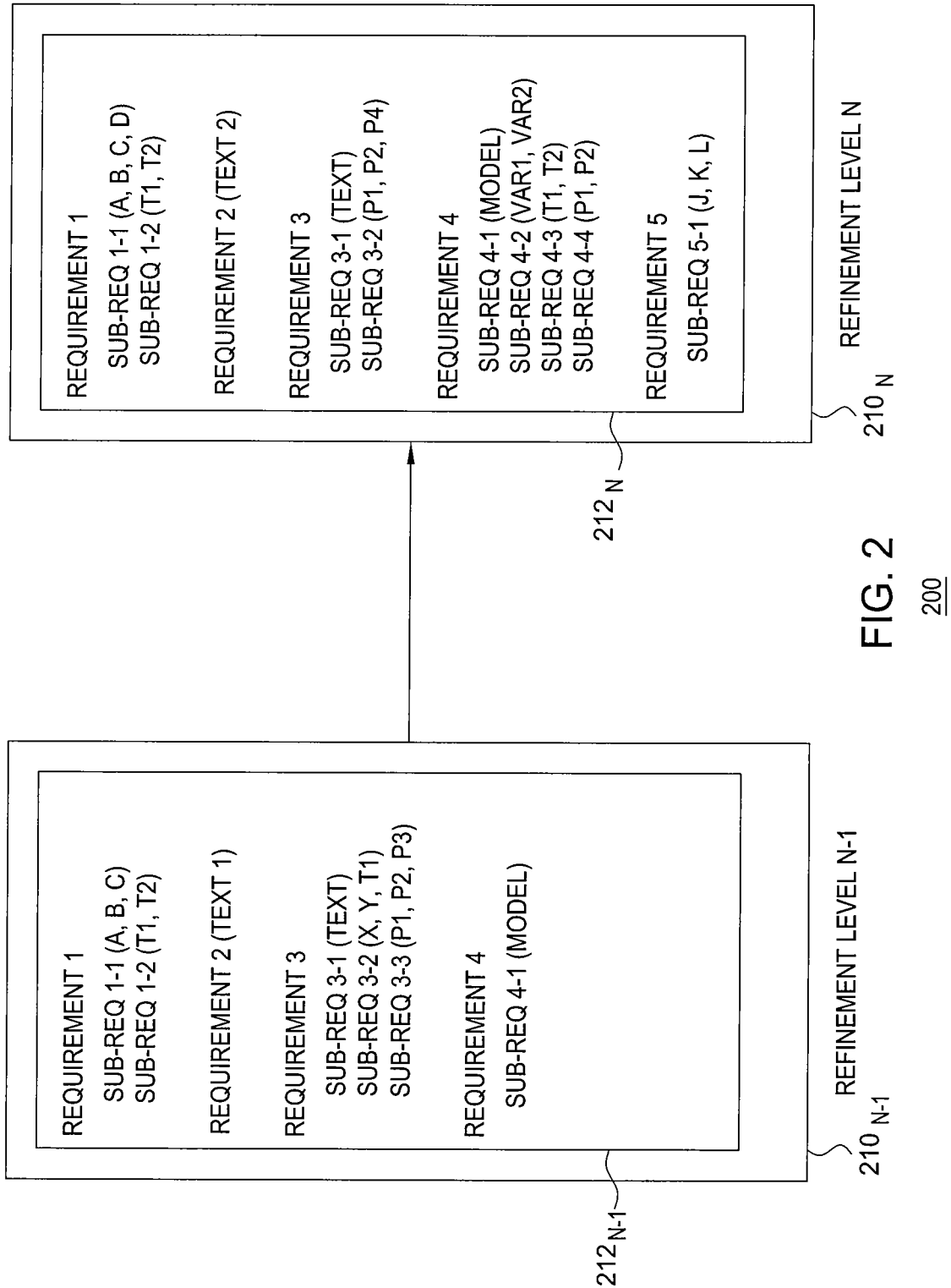
FIG. 2 depicts a high-level block diagram of a system specification refinement process showing modification of requirement data and sub-requirement data of a system specification.

FIG. 2 depicts a high-level block diagram of a system specification refinement process showing modification of specification data of a system specification. Specifically, system specification refinement process 200 depicts modification of requirement data and sub-requirement data of a system specification. A system specification of a second refinement level (n) is generated from a system specification of a first refinement level (n-1). The system specification of the second refinement level (n) inherits the specification data of the system specification of the first refinement level (n-1). The inherited specification data of the system specification of the second refinement level (n) is modified. As depicted in FIG. 2, modifications include adding new specification data, modifying existing specification data, and removing existing specification data.

As depicted in FIG. 2, first refinement level (RL) $210_{N-1}$ includes a first system specification (SS) $212_{N-1}$ and second refinement level (RL) $210_N$ includes a second system specification (SS) $212_N$. The SSs $212_{N-1}$ and $212_N$ are associated with one system. The SSs $212_{N-1}$ and $212_N$ include successively detailed system specifications for that one system. The SSs $212_{N-1}$ and $212_N$ each include specification data including a plurality of requirements, associated sub-requirements, and technical information further defining the requirements and the associated sub-requirements. As depicted in FIG. 2, SS $212_N$ inherits specification data of SS $212_{N-1}$ and the inherited specification data of SS $212_{N-1}$ from RL $210_{N-1}$ is modified on RL $210_N$, forming thereby more detailed SS $212_N$ on RL $210_N$.

As depicted in FIG. 2, SS $212_{N-1}$ includes four requirements. The first requirement includes two sub-requirements, where the first sub-requirement includes three parameters A, B, and C and the second sub-requirement includes two timing parameters T1 and T2, all of which further define the first requirement. The second requirement includes text (denoted as TEXT1) defining the second requirement. The third requirement includes three sub-requirements, where the first sub-requirement includes text, the second sub-requirement includes three parameters X, Y, and T1, and the third sub-requirement includes three parameters P1, P2, and P3, all of which further define the third requirement. The fourth requirement includes one sub-requirement which specifies a model.

As depicted in FIG. 2, SS $212_N$ includes five requirements. The first requirement includes two sub-requirements, where the first and second sub-requirements include four parameters A, B, C, D and two timing parameters T1 and T2, respectively. The second requirement includes text (denoted as TEXT2). The third requirement includes two sub-requirements, where the first and second sub-requirements include text and parameters P1, P2, and P4, respectively. The fourth requirement includes four sub-requirements, where the first, second, third, and fourth sub-requirements include a model, variables VAR1 and VAR2, timing parameters T1 and T2, and parameters P1 and P2, respectively. The fifth requirement includes one sub-requirement including three parameters J, K, and L.

As depicted in FIG. 2, inherited specification data of SS $212_{N-1}$ is modified, on RL $210_N$, to form more detailed SS $212_N$. At the requirements level, a new requirement was added (the fifth requirement) and a requirement was modified (the second requirement was modified from TEXT1 to TEXT2). At the sub-requirements level, sub-requirements were added (the second, third, and fourth sub-requirements were added to the fourth requirement, and a first sub-requirement was added to the new fifth requirement) and a sub-requirement was removed (the second sub-requirement of the third requirement). At the technical information level, technical information was added, modified, and removed at both the requirements level and the sub-requirements level.

As depicted in FIG. 2, specification data modifications may be performed at various different levels or combinations of levels, including at the requirement level, sub-requirement level, or even on technical information of a requirement or sub-requirement. For example, with respect to the requirement level, a requirement may be removed, modified, or added, and the like, as well as various combinations thereof. For example, with respect to the sub-requirement level, a sub-requirement may be removed, modified, or added, and the like, as well as various combinations thereof. For example, with respect to technical information of a requirement or sub-requirement, a portion of a requirement or sub-requirement (e.g., text, parameters, functions, variables, values, data, models, and the like, as well as various combinations thereof) may be removed, modified, or added, and the like, as well as various combinations thereof.

Furthermore, although omitted for purposes of clarity, specification data may be modified using various other modifications. In one embodiment, in which requirements are organized in a hierarchy having multiple hierarchical levels, modification of specification data may include moving specification data within a hierarchical level or moving specification data between hierarchical levels. The movement of specification data between hierarchical levels may be better understood with respect to FIG. 3. In one embodiment, modification of specification data may include applying mapping operators. The application of mapping operators to specification data is described in additional detail herein below.

Figure 3:
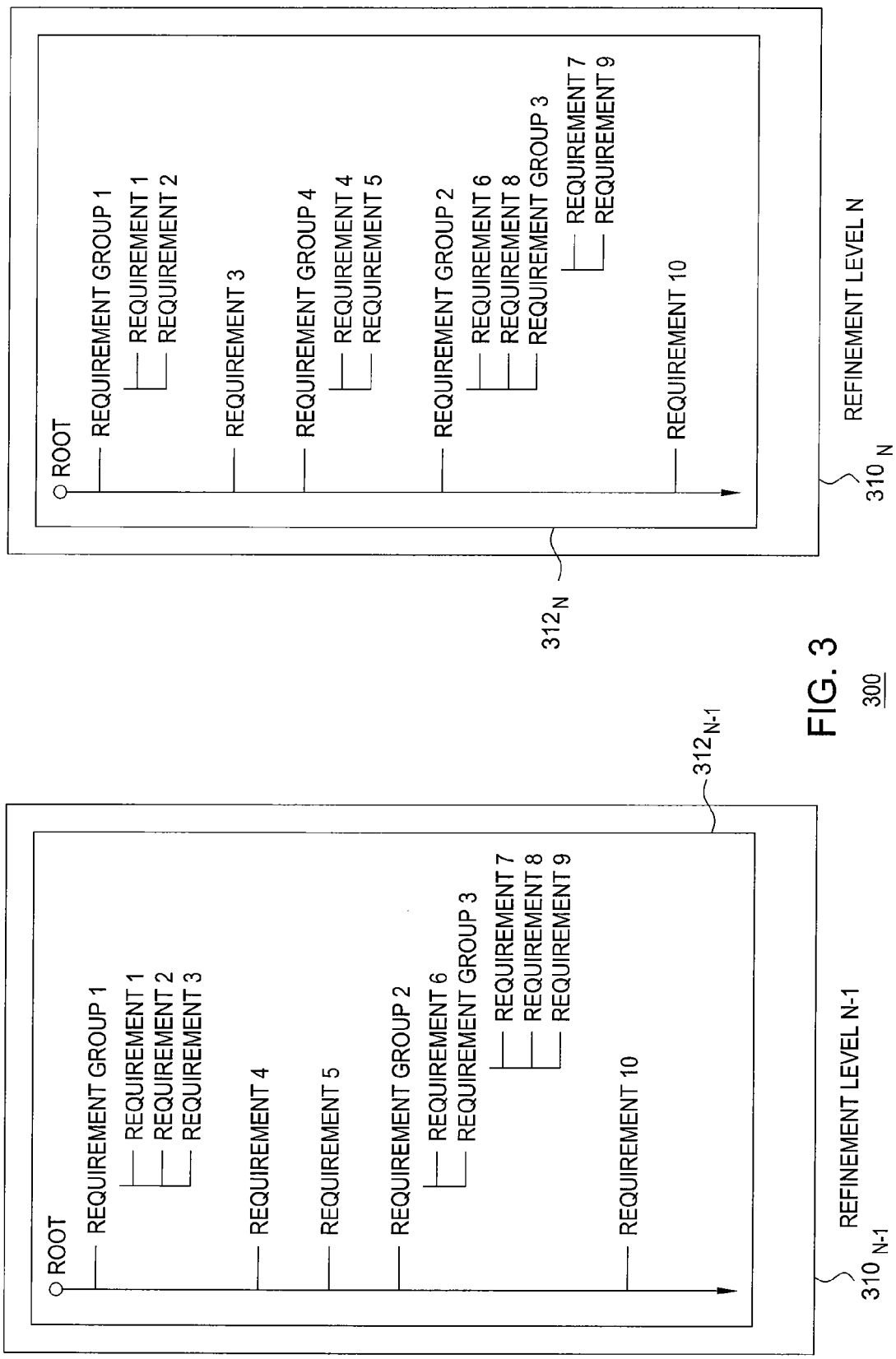
FIG. 3 depicts a high-level block diagram of a system specification refinement process showing modification of a hierarchical requirement structure of a system specification.

FIG. 3 depicts a high-level block diagram of a system specification refinement process showing modification of specification data of a system specification. Specifically, system specification refinement process 300 depicts modification of a hierarchical requirement structure of a system specification. As depicted in FIG. 3, first and second refinement levels (RLs) $310_{N-1}$ and $310_N$ include first and second system specifications (SSs) $312_{N-1}$ and $312_N$, respectively. The SSs $312_{N-1}$ and $312_N$ are associated with one system, and include successively detailed system specifications for that one system. The SSs $312_{N-1}$ and $312_N$ each include specification data including a plurality of requirements. As depicted in FIG. 3, SS $312_N$ inherits specification data of SS $312_{N-1}$ and the inherited specification data of SS $312_{N-1}$ from RL $310_{N-1}$ is modified on RL $310_N$, forming thereby more detailed SS $312_N$ on RL $310_N$.

As depicted in FIG. 3, each level of the hierarchy may include groups of requirements and/or individual requirements. A group of requirements may include one or more other groups of requirements. In other words, each requirement may be maintained individually or associated with a requirement group and, similarly, each requirement group may be maintained individually or associated with another requirement group. The hierarchy may include any number of levels, and each hierarchical level may include any association of requirements and requirement groups. Although primarily depicted and described with respect to a specific hierarchy having specific relationships between hierarchical levels, requirement groups, and requirements, various other hierarchical organizations of requirements may be realized.

As depicted in FIG. 3, SS $312_{N-1}$ includes four hierarchical levels. The first hierarchical level is the root level. The second hierarchical level, which is directly below the root level in the hierarchy, includes a requirement group one, requirements four and five, a requirement group two, and a requirement ten. The third hierarchical level is directly below the first hierarchical level and above the fourth hierarchical level. The third hierarchical level includes, within requirement group one, requirements one, two, and three. The third hierarchical level also includes, within requirement group two, requirement six and requirement group three. The fourth hierarchical level is directly below the third hierarchical level (and is the bottom level). The fourth hierarchical level includes, within requirement group three, requirements seven, eight, and nine.

As depicted in FIG. 3, SS $312_N$ includes four hierarchical levels. The first hierarchical level is the root level. The second hierarchical level includes a requirement group one, requirement three, requirement groups four and two, and a requirement ten. The third hierarchical level includes, within requirement group one, requirements one and two. The third hierarchical level also includes, within requirement group four, requirements four and five. The third hierarchical level also includes, within requirement group two, requirements six and eight and requirement group three. The fourth hierarchical level includes, within requirement group three, requirements seven and nine.

As depicted in FIG. 3, SS $312_N$ defined in RL $310_N$ includes numerous movements of requirements and requirement groups within and between hierarchical levels. The requirement three was removed from requirement group one (third hierarchical level) and moved to the second hierarchical level (without being associated with a requirement group). The requirements four and five were moved from hierarchical level two to hierarchical level three (added to a new requirement group, denoted as requirement group four which was implemented at hierarchical level two). The requirement eight was moved from belonging to requirement group three (and being in the fourth hierarchical level) to belonging to requirement group two (and being in the third hierarchical level).

As depicted in FIG. 3, for requirements organized in a hierarchy having multiple hierarchical levels, modification of specification data may include moving specification data between hierarchical levels. A requirement may be moved within a hierarchical level, moved from a higher hierarchical level to a lower hierarchical level, or moved from a lower hierarchical level to a higher hierarchical level. A requirement group may be moved within a hierarchical level, moved from a higher hierarchical level to a lower hierarchical level, or moved from a lower hierarchical level to a higher hierarchical level. A requirement may be added to a requirement group or removed from a requirement group. A requirement group may be added to another requirement group or removed from another requirement group.

Although omitted from FIG. 2 and FIG. 3 (for purposes of clarity in describing different modifications which may be made to specification data), a system specification of refinement level n may be modified using a mapping operator. A mapping operator is an instruction that defines the handling of inherited specification data during the specification data inheritance process in which specification data of refinement level n is inherited from specification data of refinement level n−1. For example, where the inherited data is text, the mapping operator may be a search and replace operation that is applied to the text of refinement level n−1 in order to provide modified text for refinement level n. A mapping operator may be applied at a requirement level, a sub-requirement level, or even on specific technical information of a sub-requirement.

Although omitted from FIG. 1, FIG. 2, and FIG. 3 for purposes of clarity, refinement levels remain linked such that modifications of specification data of the system specification of refinement level n−1 is propagated to the system specification of refinement level n. In one embodiment, in which specification data of the system specification of refinement level n includes an overriding value which overrides a value of the specification data of the system specification of refinement level n−1, modification of the value of the specification data of the system specification of refinement level n−1 does not propagate to the corresponding specification data of the system specification of refinement level n.

Figure 4:
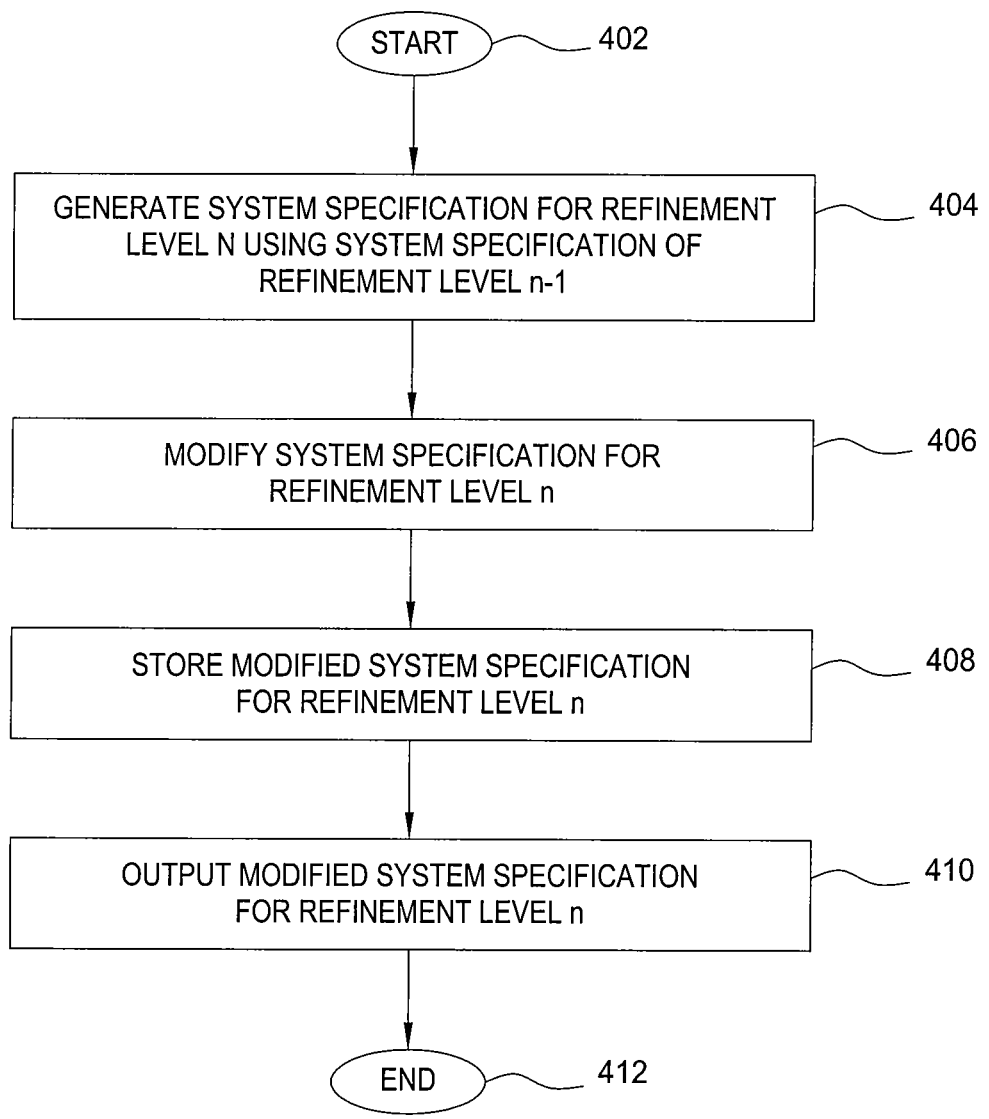
FIG. 4 depicts a method according to one embodiment of the present invention.

FIG. 4 depicts a method according to one embodiment of the present invention. Specifically, method 400 of FIG. 4 includes a method for generating a system specification at a second refinement level using specification data inherited from a system specification at a first refinement level, and modifying the inherited specification data at the second refinement level. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, a system specification is generated for refinement level n. The system specification for refinement level n is generated using a system specification of refinement level n−1. The system specification generated for refinement level n inherits the specification data of the system specification of refinement level n−1. The generation of the system specification for refinement level n may be better understood with respect to FIG. 1. At step 406, the system specification for refinement level n is modified. The modification of the system specification for refinement level n may be better understood with respect to FIG. 2 and FIG. 3.

At step 408, the system specification for refinement level n is stored. The system specification for refinement level n may be stored in any computer readable storage medium. In one embodiment, system specification for refinement level n may be stored across multiple computer readable storage media. The system specification for refinement level n may be stored in any of a number of different formats. In one embodiment, the format in which system specification for refinement level n is stored may be dependant on the format in which the system specification for refinement level n is required or desired to be output (e.g., formats adapted for displaying the system specification for refinement level n, formats adapted for transmitting system specification for refinement level n over a signal bearing medium, and the like, as well as various combinations thereof).

At step 410, the modified system specification for refinement level n is output. The modified system specification for refinement level n may be output in one of a number of formats. The modified system specification for refinement level n may be output to one or more display devices, output to another storage device (e.g., internal and/or external storage device), output to a communication module and/or communication application adapted for transmitting modified system specification for refinement level n, and the like, as well as various combinations thereof. The modified system specification for refinement level n may be output in various other manners and for various other reasons and applications.

In one embodiment, in which the modified system specification for refinement level n is displayed, modified system specification for refinement level n may be displayed on various different display devices (e.g., computers, televisions, and the like) using various different display applications. In one embodiment, the modified system specification for refinement level n may be displayed in a word processing application. In one embodiment, the modified system specification for refinement level n may be displayed in a graphical display application. The modified system specification for refinement level n may be stored in a format adapted for being converted into one of the system specification display formats (e.g., for being converted into a Microsoft WORD format, a Hypertext Markup Language (HTML) format, an Extensible Markup Language (XML) format, and the like). An exemplary system specification display is depicted and described with respect to FIG. 5.

Figure 5:
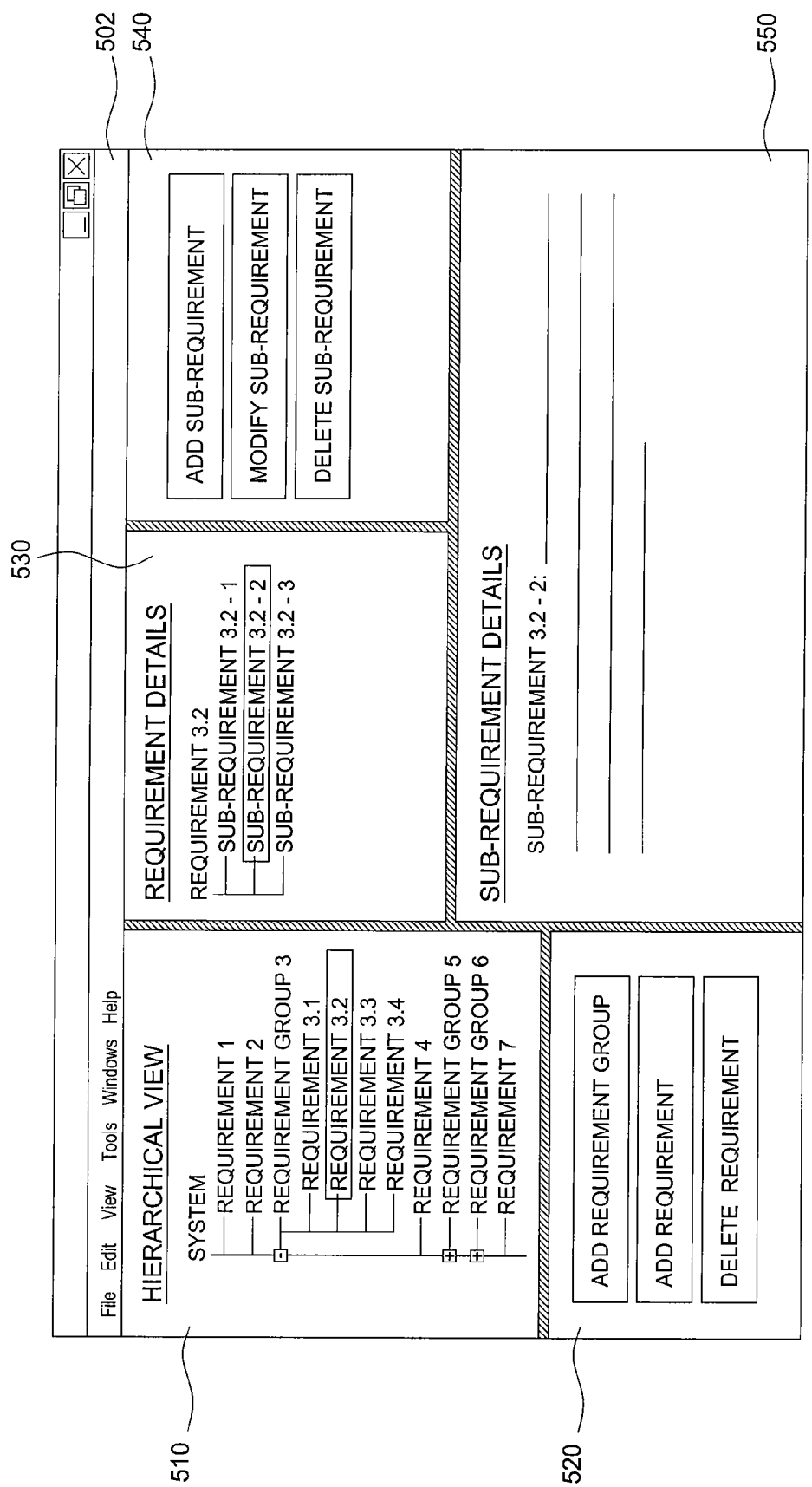
FIG. 5 depicts an exemplary system specification display.

FIG. 5 depicts an exemplary system specification display. Specifically, system specification display 500, which is displayed using a graphical user interface, includes a plurality of display portions which comprise frames of the system specification display. Specifically, system specification display 500 includes a menu portion 502, a hierarchical view frame 510, a requirements action frame 520, a requirement details frame 530, a sub-requirements action frame 540, and a sub-requirement details frame 550. Although omitted for purposes of clarity, each of the hierarchical view frame 510, requirements action frame 520, requirement details frame 530, sub-requirements action frame 540, and sub-requirement details frame 550 may include a scroll bar.

The menu portion 502 includes menu buttons FILE, EDIT, VIEW, TOOLS, WINDOWS, and HELP, each of which may include one or more menu options which may be accessed from drop-down menus which are displayed by selecting the respective menu buttons. The menu options available from drop-down menus associates with menu buttons of menu portion 502 may include any options for performing any of the various functions of the present invention. Although omitted for purposes of clarity, menu portion 502 may include various toolbars which provide shortcuts to menu options available from drop-down menus associates with menu buttons of menu portion 502.

The hierarchical view frame 510 displays a hierarchical view of requirement groups and requirements associated with a selected system. For example, hierarchical view frame 510 displays a hierarchical view of a system having a number of different requirement groups and requirements (some of which may be viewed using a scroll bar which is omitted for purposes of clarity). As depicted in FIG. 5, a requirement group including associated requirements may include an option to expand the requirement group (a "+" button) in order to view requirements of that requirement group and an option to contract the requirement group (a "−" button) in order to hide requirements of that requirement group.

The requirement groups and requirements displayed in hierarchical view frame 510 may be selected, and various actions may be performed on a highlighted requirement group or requirement using menu portion 502, requirements action frame 520, and/or requirements details frame 530. For example, as depicted in FIG. 5, requirement 3.2 of requirement group 3 (which has been expanded to display the requirements which belong to requirement group 3) is selected, thereby resulting the display of information associated with requirement 3.2 in requirement details frame 530 (and, although omitted for purpose of clarity, in one or more other frames, such as requirements action frame 540 and/or a sub-requirement details frame 550).

The requirements action frame 520 includes action buttons which may be selected to perform associated actions. Specifically, as depicted in FIG. 5, requirements action frame 520 includes ADD REQUIREMENT GROUP, ADD REQUIREMENT, and DELETE REQUIREMENT buttons. The selection of one or more requirement groups and/or requirements from hierarchical view frame 510, and selection of one of the buttons of requirements action frame 520 may produce various results (e.g., creation/deletion of items in hierarchical view frame 510, display of information in requirement details frame 530 and/or sub-requirement details frame 550, display of information entry fields in one or more frames, opening of one or more additional windows, and the like, as well as various combinations thereof). Although omitted for purposes of clarity, various other action buttons may be included within requirements action frame 520.

For example, selection of an existing requirement group in hierarchical view frame 510 and selection of the ADD REQUIREMENT GROUP button from requirements action frame 520 results in the addition of a requirements sub-group within the selected requirement group. Similarly, for example, selection of SYSTEM from hierarchical view frame 510 and selection of the ADD REQUIREMENT button from requirements action frame 520 results in the addition of a new requirement at the system level within the hierarchy. In this example, information entry means may be displayed (e.g., in one or more of requirement details frame 530, sub-requirements action frame 540, sub-requirement details frame 550, a separate window, and the like) to allow specification of technical details of the additional requirement.

The requirement details frame 530 displays details associated with a requirement selected in hierarchical view frame 510. For example, since requirement 3.2 of requirement group 3 is selected in hierarchical view frame 510, requirement details frame 530 displays details of requirement 3.2. Specifically, as depicted in FIG. 5, requirement details frame 530 displays three sub-requirements which further define requirement 3 (denoted as Sub-Requirement 3.2-1, Sub-Requirement 3.2-2, and Sub-Requirement 3.2-3). In one embodiment, requirements details frame 530 may include at least a portion of the details of sub-requirements displayed in requirements details frame 530 (while additional details of the sub-requirements may be displayed in sub-requirements details frame 550).

Similar to the requirement groups and requirements displayed in hierarchical view frame 510, sub-requirements displayed in requirement details frame 530 may be selected, and various actions may be performed on a selected sub-requirement using menu portion 502, sub-requirement action frame 540, and/or sub-requirement details frame 550. For example, as depicted in FIG. 5, sub-requirement 3.2-2 of requirement 3.2 is selected, thereby resulting in the display of information associated with sub-requirement 3.2-2 in sub-requirement details frame 550 (and, although omitted for purpose of clarity, in one or more other frames, such as requirements action frame 540).

The sub-requirement action frame 540 includes action buttons which may be selected to perform associated actions. Specifically, sub-requirement action frame 540 includes ADD SUB-REQUIREMENT, MODIFY SUB-REQUIREMENT, and DELETE SUB-REQUIREMENT buttons. The selection of one or more sub-requirements from sub-requirement details frame 530, and selection of one of the buttons of sub-requirement action frame 540 may produce various results (e.g., creation, modification, or deletion of a sub-requirement, display of information in sub-requirement details frame 550, display of information entry fields in one or more frames, opening of one or more additional windows, and the like, as well as various combinations thereof). Although omitted for purposes of clarity, various other action buttons may be included within sub-requirement action frame 540.

For example, selection of a requirement in requirement details frame 530 and selection of the ADD SUB-REQUIREMENT button from sub-requirement action frame 540 results in the addition of a sub-requirement to the selected requirement (e.g., adding sub-requirement 3.2-4 to requirement 3.2). Similarly, for example, selection of a sub-requirement in requirement details frame 530 and selection of the MODIFY SUB-REQUIREMENT button from sub-requirement action frame 540 results in a means for modifying the selected sub-requirement. In this example, information entry means may be displayed (e.g., in one or more of requirement details frame 530, sub-requirements action frame 540, sub-requirement details frame 550, a separate window, and the like) to allow modification of the technical details of the selected sub-requirement.

The sub-requirement details frame 550 displays details associated with a sub-requirement selected in requirement details frame 530. For example, since sub-requirement 3.2-2 of requirement 3.2 is selected in requirement details frame 530, sub-requirement details frame 550 displays details of sub-requirement 3.2-2. Specifically, as depicted in FIG. 5, sub-requirement details frame 550 displays technical information which further defines requirement 3. In one embodiment, sub-requirements details frame 550 may include at least a portion of the details of sub-requirements displayed in requirements details frame 530 (while additional details of the sub-requirements may be displayed in one or more other frames or other windows).

Similar to the sub-requirements displayed in requirement details frame 530, technical information displayed in sub-requirement details frame 550 may be viewed, selected, modified, and the like, and various actions may be performed on the technical information using menu portion 502 and/or sub-requirement action frame 540. For example, as depicted in FIG. 5, sub-requirement 3.2-2 of requirement 3.2 is selected, thereby resulting in the display of technical information associated with sub-requirement 3.2-2 in sub-requirement details frame 550 (and, although omitted for purpose of clarity, in one or more other frames, such as requirements action frame 540). As described herein, technical information associated with a sub-requirement that is displayed in sub-requirement details frame 550 may be modified.

Although primarily depicted and described with respect to specific number of frame and configuration of frames, a system specification display according to the present invention may include different numbers of and/or configurations of frames. Although depicted and described with respect to one window having multiple frames, in other embodiments multiple windows may be used to provide the system specification display. In such embodiments, various different numbers, types, sizes, and configurations of windows may be used to provide the system specification display. In other words, the present invention is not limited by the system specification display depicted and described with respect to FIG. 5; rather, various different system specification displays may be used to provide various functions of the present invention.

Although depicted and described with respect to a user interaction model in which a system specification is created and modified using a computer having a monitor, keyboard, and mouse, the system specification creation and modification functions of the present invention may be implemented using other devices or combinations of devices, such as televisions and associated television interaction devices (e.g., set top box, remote control, and the like), portable user devices, and the like, as well as various combinations thereof.

Although depicted and described with respect to a user interaction model in which the system specification creation and modification functions of the present invention are provided using a graphical user interface (GUI), the system specification creation and modification functions of the present invention may be implemented using various other user interaction models, such as user interaction models using text-based interfaces, user interaction models using zooming user interfaces (ZUIs, and the like, as well as various combinations thereof.

Figure 6:
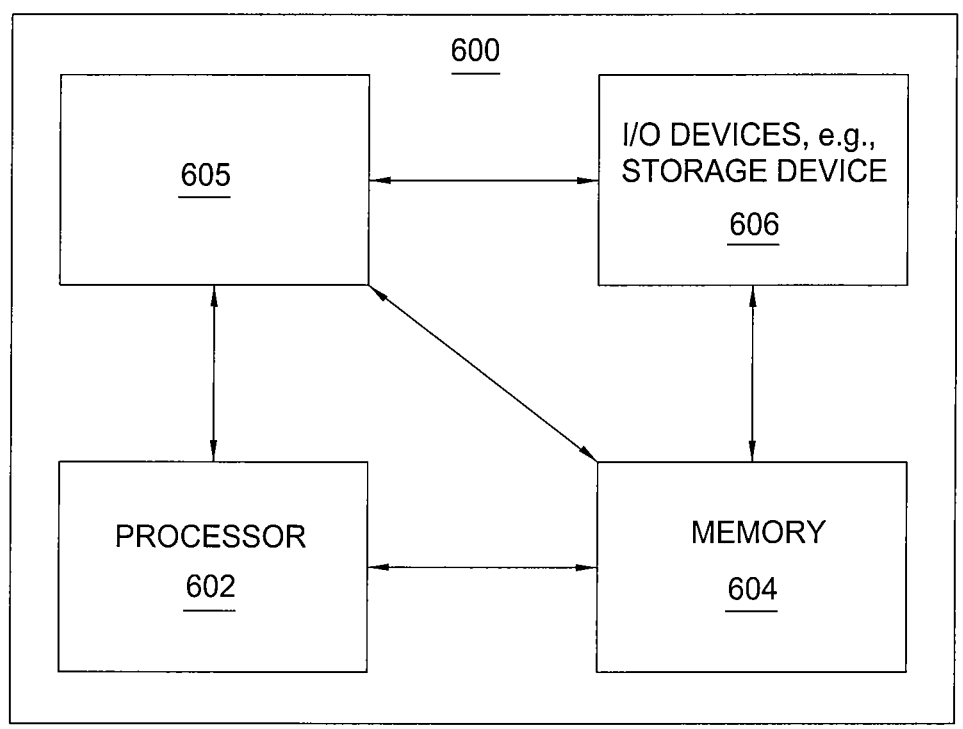
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), an system specification management module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present system specification management process 605 can be loaded into memory 604 and executed by processor 602 to implement the functions as discussed hereinabove. As such, system specification management process 605 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
   using a processor for:
      identifying a first system specification defined at a first refinement level,
   wherein the first system specification comprises specification data;
      generating a second system specification at a second refinement level, wherein the second system specification inherits the specification data of the first system specification;
      modifying at least a portion of the inherited specification data of the second system specification, wherein modifying at least a portion of the inherited specification data comprises applying a mapping operator to a portion of the specification data of the first system specification of the first refinement level to provide modified specification data for the second system specification of the second refinement level; and
      storing the second system specification including the modified specification data.

2. The method of claim 1, wherein modifying at least a portion of the inherited specification data comprises at least one of adding a requirement to the second system specification, modifying a requirement of the second system specification, and removing a requirement from the second system specification.

3. The method of claim 1, wherein modifying at least a portion of the inherited specification data comprises at least one of:
   adding a sub-requirement to an existing requirement of the second system specification;
   modifying a sub-requirement of an existing requirement of the second system specification; and
   removing a sub-requirement of an existing requirement of the second system specification.

4. The method of claim 1, wherein modifying at least a portion of the inherited specification data comprises moving a portion of the specification data from a first hierarchical level to a second hierarchical level.

5. The method of claim 1, wherein the specification data comprises a plurality of requirements.

6. The method of claim 5, wherein at least one of the plurality of requirements comprises at least one sub-requirement comprising technical information defining the at least one requirement.

7. The method of claim 1, wherein the modifying at least a portion of the inherited specification data of the second system specification comprises adding newly defined specification data into the second system specification wherein the newly defined specification data is not contained in the first system specification.

8. The method of claim 1, further comprising:
   identifying the second system specification defined at the second refinement level, wherein the second system specification comprises the modified specification data;
   generating a third system specification at a third refinement level, wherein the third system specification inherits the modified specification data of the second system specification;
   modifying the inherited specification data of the third system specification; and
   storing the third system specification including the modified specification data.

9. An apparatus, comprising:
   a processor configured for:
      identifying a first system specification defined at a first refinement level, wherein the first system specification comprises specification data;
      generating a second system specification at a second refinement level, wherein the second system specification inherits the specification data of the first system specification;
      modifying at least a portion of the inherited specification data of the second system specification, wherein modifying at least a portion of the inherited specification data comprises applying a mapping operator to a portion of the specification data of the first system specification of the first refinement level to provide modified specification data for the second system specification of the second refinement level; and
      storing the second system specification including the modified specification data.

10. The apparatus of claim 9, wherein modifying at least a portion of the inherited specification data comprises at least one of:
   adding a requirement to the second system specification;
   modifying a requirement of the second system specification; and
   removing a requirement from the second system specification.

11. The apparatus of claim 9, wherein modifying at least a portion of the inherited specification data comprises at least one of:
   adding a sub-requirement to an existing requirement of the second system specification;
   modifying a sub-requirement of an existing requirement of the second system specification; and
   removing a sub-requirement of an existing requirement of the second system specification.

12. The apparatus of claim 9, wherein modifying at least a portion of the inherited specification data comprises:
   moving a portion of the specification data from a first hierarchical level to a second hierarchical level.

13. The apparatus of claim 9, wherein the specification data comprises a plurality of requirements.

14. The apparatus of claim 13, wherein each of the requirements comprises at least one sub-requirement.

15. The apparatus of claim 14, wherein each sub-requirement comprises technical information defining the associated requirement.

16. The apparatus of claim 9, wherein the processor is further configured for:
   identifying the second system specification defined at the second refinement level, wherein the second system specification comprises the modified specification data;
   generating a third system specification at a third refinement level, wherein the third system specification inherits the modified specification data of the second system specification;
   modifying the inherited specification data of the third system specification; and
   storing the third system specification including the modified specification data.

17. A non-transitory computer readable storage medium storing a software program, that, when executed by a computer, causes the computer to perform a method comprising:
   identifying a first system specification defined at a first refinement level, wherein the first system specification comprises specification data;
   generating a second system specification at a second refinement level, wherein the second system specification inherits the specification data of the first system specification;
   modifying at least a portion of the inherited specification data of the second system specification, wherein modifying at least a portion of the inherited specification data comprises applying a mapping operator to a portion of the specification data of the first system specification of the first refinement level to provide modified specification data for the second system specification of the second refinement level; and
   storing the second system specification including the modified specification data.

18. The non-transitory computer readable storage medium of claim 17, the method further comprising:
   identifying the second system specification defined at the second refinement level, wherein the second system specification comprises the modified specification data;
   generating a third system specification at a third refinement level, wherein the third system specification inherits the modified specification data of the second system specification;
   modifying the inherited specification data of the third system specification; and
   storing the third system specification including the modified specification data.

* * * * *